(12) United States Patent
Sakou

(10) Patent No.: US 8,707,309 B2
(45) Date of Patent: Apr. 22, 2014

(54) IMAGE PROCESSING APPARATUS AND CONTROL METHOD AND PROGRAM THEREOF

(75) Inventor: Ritsuto Sakou, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 2382 days.

(21) Appl. No.: 11/183,951

(22) Filed: Jul. 19, 2005

(65) Prior Publication Data

US 2006/0026597 A1    Feb. 2, 2006

(30) Foreign Application Priority Data

Jul. 28, 2004    (JP) ................................. 2004-219634

(51) Int. Cl.
*G06F 9/46*    (2006.01)

(52) U.S. Cl.
USPC .......................................... 718/101; 718/102

(58) Field of Classification Search
USPC ......................................................... 718/101
See application file for complete search history.

(56) References Cited

U.S. PATENT DOCUMENTS

| | | | | |
|---|---|---|---|---|
| 5,794,036 | A * | 8/1998 | Gomi et al. | 718/105 |
| 5,826,080 | A * | 10/1998 | Dworzecki | 718/103 |
| 7,050,203 | B2 | 5/2006 | Ito | 358/468 |
| 7,617,274 | B2 * | 11/2009 | Coughlin et al. | 709/203 |
| 7,926,057 | B2 * | 4/2011 | Chan et al. | 718/102 |
| 2003/0009701 | A1 | 1/2003 | Kurosawa | |
| 2003/0046030 | A1 * | 3/2003 | Lee et al. | 702/186 |

FOREIGN PATENT DOCUMENTS

| | | |
|---|---|---|
| JP | 03-015640 A | 1/1991 |
| JP | 05-215605 A | 8/1993 |
| JP | 10-133765 | 5/1998 |
| JP | 11-355198 | 12/1999 |
| JP | 2000-207140 A | 7/2000 |
| JP | 2001-318742 A | 11/2001 |
| JP | 2002-368916 | 12/2002 |

OTHER PUBLICATIONS

Aug. 7, 2007 Japanese Official Action in Japanese Patent Application No. 2004-219634.
Jan. 18, 2011 Official Action in Japanese Patent Appln. No. 2008-237592.

* cited by examiner

*Primary Examiner* — Camquy Truong
(74) *Attorney, Agent, or Firm* — Fitzpatrick, Cella, Harper & Scinto

(57) ABSTRACT

An image processing apparatus capable of registering in a memory the execution time interval or the next execution time for the periodic processing periodically executed, comprising: a unit adapted to registration for registering in the memory the execution time interval or the next execution time for a second periodic processing after registering in the memory the execution time interval and the next execution time for a first periodic processing; and a unit adapted to revising for comparing the next execution time for said second periodic processing and the next execution time for said first periodic processing according to the registration by said unit adapted to registration, and revising either of the next execution time for said second periodic processing and the next execution time for said first periodic processing.

14 Claims, 5 Drawing Sheets

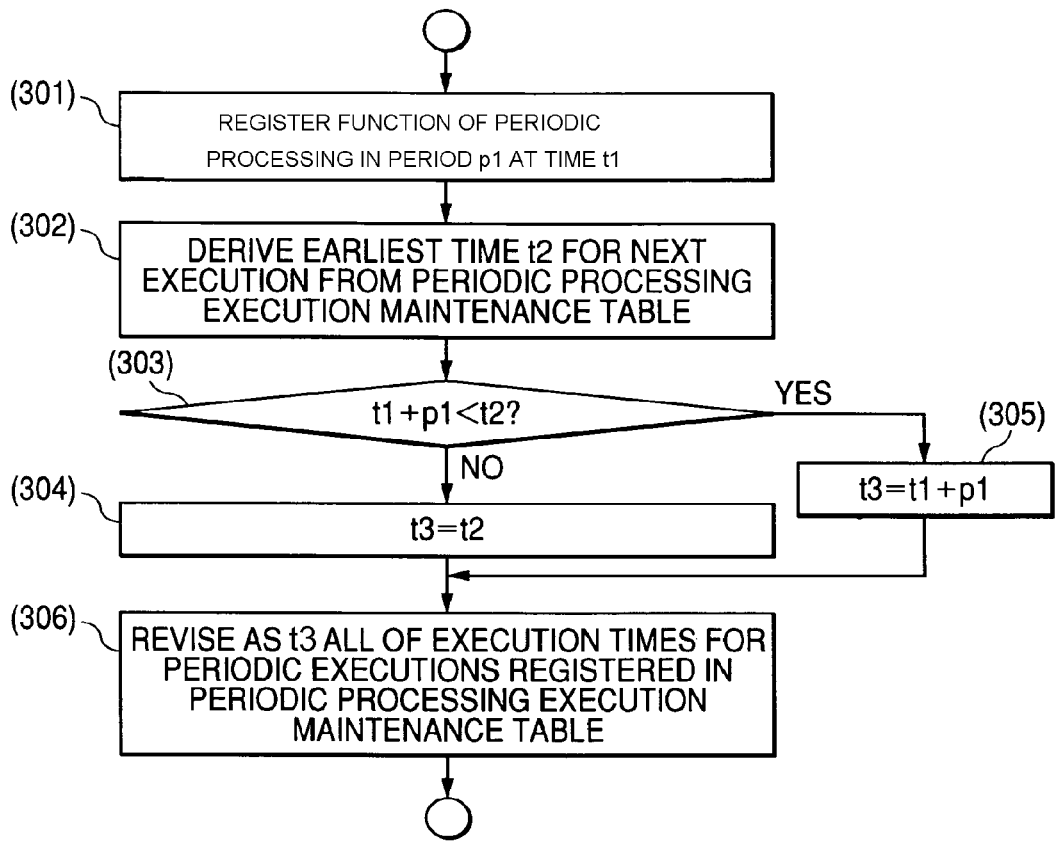

FIG. 5

| TIME | APPARATUS STATE | SNTP TIME SYNCHRONIZING AT INTERVAL OF 60 MINUTES (501/502) | iFax RECEIVING AT INTERVAL OF 90 MINUTES (503) | E-mail RECEIVING AT INTERVAL OF 30 MINUTES (504) |
|---|---|---|---|---|
| 9:50 | NORMAL MODE | | | REGISTER 513 |
| 10:00 | | 511 EXECUTION | 512 EXECUTION | 514 EXECUTION |
| 10:10 | NORMAL MODE | | | |
| 10:20 | POWER SAVING MODE | | MOVE UP | MOVE UP 515 (EXECUTION) |
| 10:30 | | | 516 (EXECUTION) | 517 EXECUTION |
| 10:40 | NORMAL MODE | | | |
| 10:50 | POWER SAVING MODE | | | MOVE UP 518 (EXECUTION) |
| 11:00 | | 519 EXECUTION | | 520 EXECUTION |

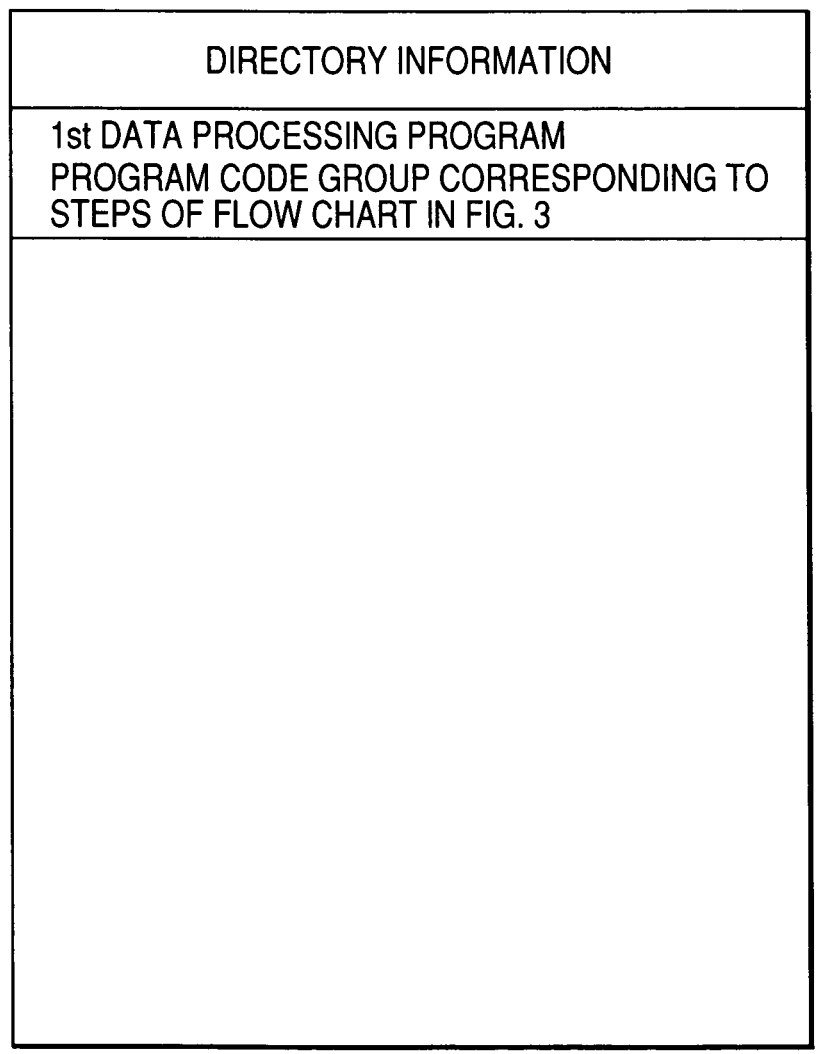

IMAGE PROCESSING APPARATUS AND CONTROL METHOD AND PROGRAM THEREOF

BACKGROUND OF THE INVENTION

1. Field of the Invention

The present invention relates to an image processing apparatus such as a digital composite machine and the like capable of performing a plurality of periodic processings and setting the time interval of each periodic processing, and to the control method and program thereof.

2. Related Background Art

In recent years, in general, the uses of a digital composite machine have been growing popular in the environment such as an office and the like. In this digital composite machine, there is a machine that has not only a scanner function, a printer function, a facsimile function, and a copier function, but also, being connected to a network, provides various functions such as a function of transmitting and receiving an E-mail, a function of transmitting an image data read by a scanner as an attached file of the E-mail, a function of transmitting the read image data as an ifax through the Internet and the like.

In such a digital composite machine, processings such as a received mail check processing for a POP server of the E-mail itself, a check processing for the POP server of the ifax reception, a polling processing for time synchronization for an SNTP server and the like are periodically performed according to time interval set up in advance. The user can set up the time interval (frequency) for executing each of these periodic processings from an operation panel and the like.

In the meantime, in recent years, low electric power consumption of office equipment has been solicited for the protection of environment.

To realize this object, there is a conventional composite machine available in which, when a standby state time where no operation is made for a fixed period of time continues, a power source supplied to each resource within the apparatus (such as a print unit, a reading unit, a display unit, a control unit and the like) is stopped, and a control of shifting to a power saving mode is performed, thereby realizing the low power consumption of the apparatus.

However, while the digital composite machine is mounted with various functions which periodically operate as described above, at the executing time of these periodic operations, a periodic processing is performed by returning to the normal operating mode from the power saving mode.

In the conventional digital composite machine, it is considered that a different time interval is set up for each of plural periodic processings, for example, such as a polling processing performed for a POP server of an E-mail reception for every 30 minutes, and a polling processing performed for an SNTP server for every 60 minutes.

At this time, for example, assuming that the polling processing of the E-mail reception is set up at the time 10:00, and the polling processing for the SNTP server is set up at the time 10:15, as the entire apparatus, these two types of the periodic processing are repeatedly performed at the timing of 10:00, 10:15, 10:30, 11:00, 11:15, and so on.

Here, in the digital composite machine set up for the periodic processing, a technique, in which shifting is made to the power saving mode when a fixed time standby state as described in the Related Background Art continues, is applied, and assuming that that fixed time is twenty minutes, it is obvious that, during 10:00 to 11:00, the shifting to the power saving mode is not possible due to the execution of the periodic processing.

Thus, there has been a problem in that, by the time set up for each of a plurality of periodic processings, an interval of the timing for performing the periodic processing as seen from the entire apparatus becomes narrow, and for this reason, the shifting to the power saving mode is unable to be made, thereby lowering power consumption efficiency.

SUMMARY OF THE INVENTION

The present invention is for solving the above described problem and provides an image processing apparatus allowing the periodic processings to be executed more efficiently and the control method thereof in the image processing apparatus in which a plurality of periodic processings are set up.

According to one aspect of the present invention, an image processing apparatus comprises:

a first register adapted to register an execution time interval or the execution time for a first periodic processing;

a second register adapted to register an execution time interval or the execution time for a second periodic processing; and a changing unit adapted to compare the execution time for said first periodic processing according to the execution time interval or the execution time registered by said first register and the execution time for said second periodic processing according to the execution time interval or the execution time registered by said second register, and change either of the execution time for said first periodic processing and the execution time for said second periodic processing.

Further, according to one aspect of the present invention, the image processing apparatus is provided, wherein the changing unit adapted to change the next execution time for the first periodic processing to the execution time for the second periodic processing in case the execution time for the second periodic processing is earlier than the execution time for the first periodic processing, and revises the execution time for the second periodic processing to the execution time for the first periodic processing in case the execution time for the first periodic processing is earlier than the execution time for the second periodic processing.

Other features, objects and advantage of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart showing one example of a first data processing procedure in the image processing apparatus according to the present invention;

FIG. 4 is a view showing one example of a periodic processing execution maintenance table secured in a RAM shown in FIG. 1;

FIG. 5 is a view showing one example of an execution schedule of a process adapted to registrationing in the image processing apparatus according to the present invention;

FIG. 7 is a view explaining a memory map of a storage medium for storing various data processing program readable by the image processing apparatus according to the present invention.

DESCRIPTION OF PREFERRED EMBODIMENTS

Now, best modes for carrying out the present invention will be described with reference to drawings.
<Explanation of System Configuration>
(First Embodiment)

Figure 1:
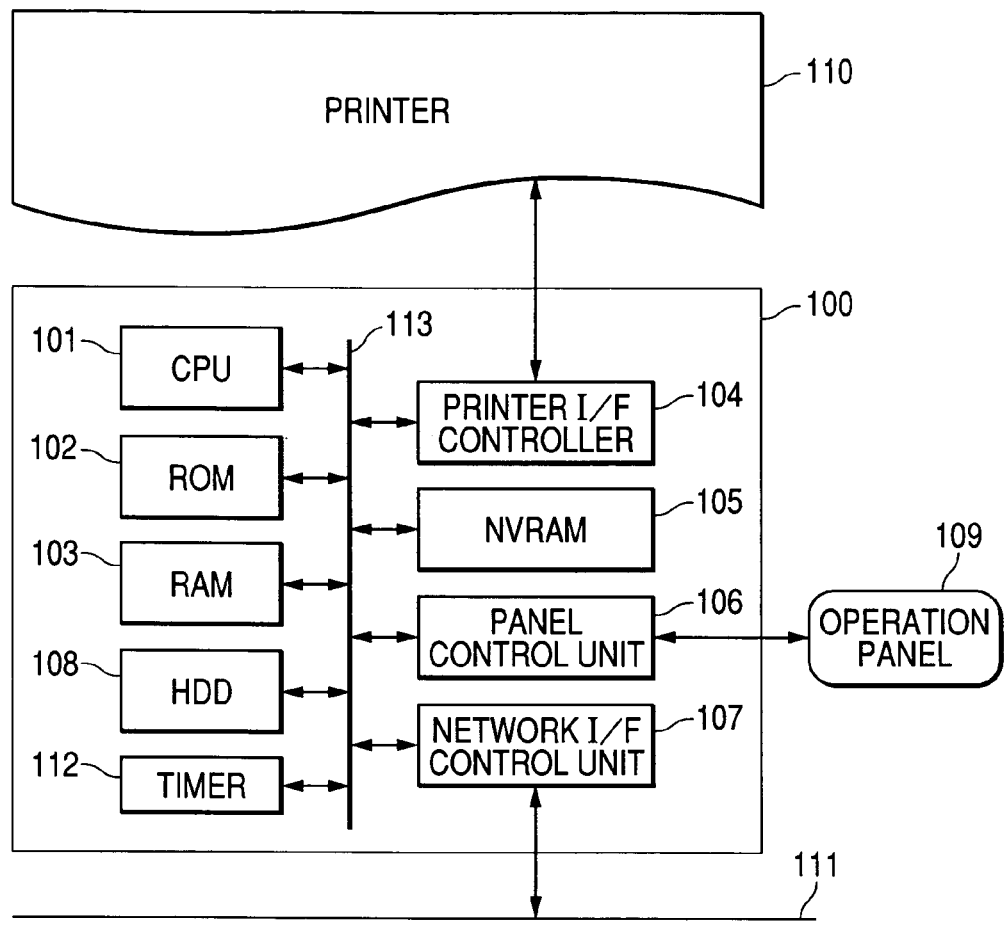
FIG. 1 is a block diagram showing one example of an image processing apparatus showing a first embodiment of the present invention.

FIG. 1 is a block diagram showing one example of an image processing apparatus showing a first embodiment of the present invention, which realizes a composite function processing through collaboration of an image processing apparatus 100 and a printer 110.

In FIG. 1, a CPU 101 executes a software program of the printer, and performs a control of the entire apparatus. A ROM 102 is a read only memory, and is stored with a boot program, fixed parameters and the like of the apparatus. A RAM 103 is a random access memory, and is used for storing a temporary data when the CPU 101 controls the apparatus.

An HDD 108 is a hard disc drive, and is used for storing various data such as for storing a print data. A timer 112 performs a control of transitional times in a timer processing. A printer I/F control unit 104 is an apparatus for controlling the printer 110. An NVRAM 105 is a non-volatile memory, and is for storing various types of setup values of the printer. A panel control unit 106 controls an operation panel 109, and performs a display of various pieces of information, and an instruction input from a user. A network I/F control unit 107 controls transmission and reception of data with a LAN 111.

A bus 113 is connected to the CPU 101, the ROM 102, the RAM 103, the HDD 108, the timer 112, the printer I/F control unit 104, the NVRAM 105, the panel control unit 106, and the network I/F control unit 107. This is a system bus in which control signals from the CPU 101 and data signals between each apparatus are transmitted and received.

In the image processing apparatus thus configured, the present embodiment comprises the following characteristic configuration.

An image processing apparatus capable of recording in a memory (for example, secured on the RAM 103 shown in FIG. 1) a starting time for a plurality of first periodic processings periodically executed and an execution time interval thereof, wherein the start time for the first periodic processing and the execution time interval are registered in the memory from the operation panel 109, and after that, the start time and the execution time interval for the second periodic processing are set up. The CPU 101 shown in FIG. 1 executes the control procedures shown in FIG. 3 in such a manner that the initial start time for the second periodic processing to be set up is aligned with the next start time for the first periodic processing.

In this manner, accompanied with inconsistency of the start time with the first periodic processing and the second periodic processing to be set up, each execution timing of intermittently executed is synchronized so as to extend the period where each periodic processing is not executed, thereby performing each periodic processing collectively at the same period efficiently.

On that occasion, the CPU 101 executes steps S303 and S304 shown in FIG. 3. That is, an add time with the initial start time for the second periodic processing which is set up by the earliest next periodic processing execution time and the setting unit registered in the RAM 103 and the execution time interval are compared, and in case it is determined that the add time is slower than the next earliest periodic processing execution time, the start time for the second periodic processing is moved forward and aligned to the next earliest periodic processing execution time.

In this manner, in case a setup is made in such a manner that the start time of the second periodic processing newly registered delays further than the next executing start time for the first periodic processing previously registered, the processing start time is adjusted so as to move forward to the executing start time of the first periodic processing which precedes the start timing of each periodic processing, and this can extend the period in which each periodic processing is not executed.

Further, the CPU 101, by executing steps S303 and S305 shown in FIG. 3, compares an add time with the initial start time for the second periodic processing which is set up by the earliest next periodic processing execution time and the setting unit registered in the RAM 103 and the execution time interval, and in case it is determined that the add time is slower than the next earliest periodic processing execution time, the start time for the second periodic processing is moved forward and aligned to the next earliest periodic processing execution time, and in case it is determined that the add time is earlier than the next earliest periodic processing execution time, the start time for the first periodic processing is aligned to the add time.

In this manner, in case the start time of the second periodic processing newly registered becomes earlier than the next executing start time for the first periodic processing previously registered, the processing start time is adjusted so as to move forward a start timing of each periodic processing to the executing start time of the second periodic processing newly set up, and this can extend the period in which each periodic processing is not executed.

Further, the CPU 101, by executing step S306 shown in FIG. 3, changes the earliest next periodic processing execution times for the first and second periodic processings registered in the RAM 103 to the adjusted next start time.

In this manner, the start timing of a plurality of periodic processings required for the image processing apparatus is aligned so as to be collectively performed at the same period, thereby achieving efficiency, and the situation in which the periodic processing execution interval ends up becoming short due to irregularity of the start times of a plurality of processings that are set up by various periods can be avoided, thereby extending the period in which each periodic processing is not executed.

Further, a maintenance table (maintenance table shown in FIG. 4) for storing the start time and the execution interval for the first and second periodic processings separately for each periodic processing is stored on the RAM 103.

In this manner, it is definitely determined whether or not the misalignment of each start timing generated from the start time of the periodic processing previously registered and the periodic processing newly registered and its interval is delayed or advanced, so that a control of moving forward the executing start timing of the newly registered periodic processing can be definitely performed.

Further, the timing for shifting the power mode of the image processing apparatus to the power saving mode is set up by the operation panel 109 shown in FIG. 1. The CPU 101 is shifted to the power saving mode by the set timing, and after that, accompanied with the execution of the first and second periodic processings, aligns the initial start time for the second period processing set up in such a manner that a request for return to the normal mode is not generated for a fixed period of time to the next start time for the first periodic processing.

In this manner, after the shifting is made to the power saving mode, it is definitely determined whether or not the misalignment of each start timing generated from the start time of the periodic processing previously registered and the periodic processing newly registered and its interval is delayed or advanced, and the time in which the power saving mode is not released is extended as much as possible, so that the power saving efficiency of the entire image processing device can be enhanced.

Figure 2:
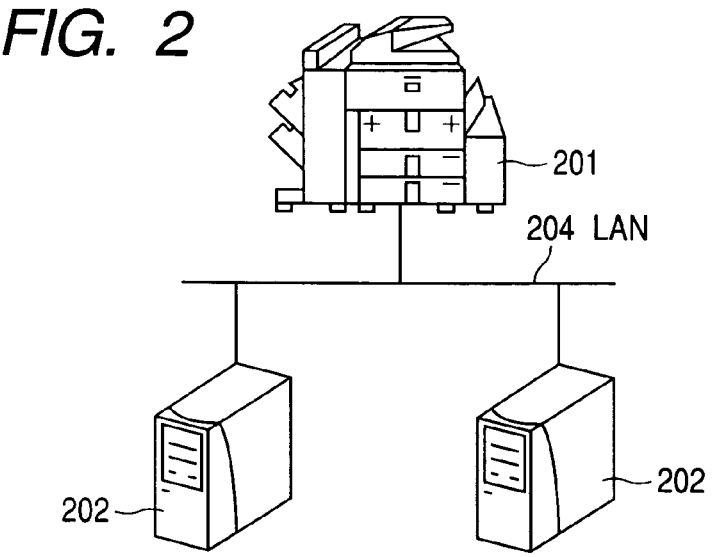
FIG. 2 is a view showing one example of an image processing system adaptable to the image processing apparatus shown in FIG. 1.

FIG. 2 is a view showing one example of the image processing system adaptable to the image processing apparatus shown in FIG. 1.

In FIG. 2, reference numeral 201 denotes a composite device for executing a composite-function processing, and is configured by a reader unit and a printer unit, an option unit, a hard disk and the like, and performs a facsimile communication processing, a network print processing and the like. Reference numeral 202 denotes an SNTP server.

In the composite system thus configured, the composite device 201 transmits a time information acquiring request to the NTP server 202, and the NTP server 202, in response to the time information acquiring request from the device 201, can perform the transmission of the time information to the device 201. Reference numeral 203 denotes a POP server. The device 201 logs in the POP server 203, and performs the read out of E-mails and Internet Fax (IFax).

FIG. 3 is a flowchart showing one example of a first data processing procedure in the image processing apparatus according to the present invention, and corresponds to the registration procedure in which the device 201 performs a new registration of the periodic processing. Steps S301 to S306 show each step, and each step is realized by loading the control program stored in the ROM 102 and the hard disk 108 to the RAM 103 by the CPU 101 shown in FIG. 1.

First, at step S301, a function (IFAX and the like) for performing the periodic processing in a period p1 at a time t1 through the operation panel 109 is registered. In this manner, ID, Summary of Processing, Execution Interval, Next Execution Time are stored together within the periodic processing execution maintenance table shown in FIG. 4, which is secured in the RAM 103.

FIG. 4 is a view showing one example of the periodic processing execution maintenance table secured in the RAM 103 shown in FIG. 1.

As shown in FIG. 4, in the present embodiment, when an instruction is issued that a function (IFAX and the like) for performing the periodic processing in a period p1 at a time t1 through the operation panel 109 be registered, each content is set up in ID, Summary of Processing, Execution Interval, and Next Execution Time. It is possible to store and control the periodic processing maintenance table within the hard disk 108 shown in FIG. 1 and other unillustrated storage device, and the present periodic processing maintenance table is referred to or renewed as occasion demands when the processing shown by the flowchart of FIG. 3 is performed.

In FIG. 4, an "ID" Column 401 shows an ID identifying the registered periodic processing. A "Summary of Processing" Column 402 shows a summary of the periodic processing. An "Execution Interval" Column 403 shows an execution interval of the periodic processing. A "Next Execution Time" Column 404 shows a next execution time of the periodic processing.

Row 411 is registered with a function for executing the periodic processing for performing an SNTP time synchronization at intervals of 60 minutes, and shows that the next execution time is [7/12 10:00]. Row 412 is registered with a function for executing the periodic processing for performing an iFax reception at intervals of 90 minutes, and shows that the next execution time is [7/12 10:30].

Next, at step S302, the CPU 101 refers to the periodic processing execution maintenance table shown in FIG. 4 stored on the RAM 103 and acquires the next earliest periodic processing execution time t2. At step S303, a time (t1+p1) which is the next execution time of the periodic processing newly registered and the earliest next periodic processing execution time t2 acquired at step S302 are compared, and in case it is determined that the time (t1+p1) which is the next execution time of the periodic processing newly registered is earlier than the next periodic processing execution time t2 (t1+p1<t2), the next execution time (t1+p1) of the periodic processing execution maintenance table is changed to t3 (S305) so that the entire registered periodic processing and the newly registered periodic processing in much earlier time t3 are executed in the same time.

In the meantime, at step S303, in case the CPU 101 determines that the time (t1+p2) which is the next execution time is earlier than the next periodic processing execution timed t2, at step S304, the next periodic processing execution time t2 is changed to t3.

At step S306, the next execution time of the entire periodic processing registered in the periodic processing maintenance table shown in FIG. 4 is changed to t3, and the processing is finished.

In this manner, the next entire periodic processing is executed in the same time, and after that, the periodic processing executable in the same time (for example, the periodic processing at intervals of 30 minutes and the periodic processing at intervals of 60 minutes) is allowed to be always executed in the same time.

As a result, the number of times returning from the power saving mode by the periodic processing is reduced to the smallest possible, thereby maximizing the time zone of the power saving mode.

Further, by this operation, each periodic processing sometimes has an execution timing earlier than the periodic interval temporarily set up in advance when a periodic processing is newly registered.

FIG. 5 is a view showing one example of the execution schedule of a register processing in the image processing apparatus according to the present invention, and shows a time in a longitudinal direction, and shows an apparatus state and the registered content of the periodic processing in a horizontal direction.

In the present embodiment, as shown in FIG. 5, for example, at time 0.9:50 when the periodic processing maintenance table is in a state as shown in FIG. 4, the operation at the time when the periodic processing of performing reception of E-mails for every 30 minute period is registered is shown.

In FIG. 5, an "apparatus operation mode" Row 501 shows whether or not the apparatus operates in the normal mode or in the power saving mode. In the present embodiment, a non-operation mode is set up in which, for example, when the non-operation state continues for ten minutes, the mode is shifted to the power saving mode.

An "SNTP time synchronization" Row 502 shows the timing by which the SNTP time synchronization processing is executed. An "iFax reception" Row 503 shows the timing by which the iFax reception processing is executed. An "E-mail reception" Row 504 shows the timing by which the E-mail processing is registered, and the timing by which the E-mail processing is executed.

At the time 09:50, as shown in the periodic processing maintenance table of FIG. 4, the next execution time of the SNTP time synchronization processing is 10:00, and the next execution time of the iFax reception is 10:30.

Consequently, in the registered periodic processing, the earliest next execution time (t2) is 10:00 hours which is the timing 511 which is the next execution time of the SNTP time synchronization.

Further, at the time 09:50 (t1), in the timing 513, the next execution time (t1+p1) of the E-mail reception processing (at intervals of 30 minutes (interval p1)) newly registered is 10:20. When comparing 10:00 (time t2) and 10:20 (t1+p1), since 10:00 is the earlier time (determination at step S303 shown in FIG. 3 is NO), it is decided that the next periodic processing (time t3) is moved forward to the timing 514 and is executed at 10:00 (time t2).

In this manner, the iFax reception processing, which has been scheduled to be executed at 10:30 which is originally the timing 516, is moved forward to 10:00.

Further, the E-mail reception processing, which has been scheduled to be executed at 10:20 which is originally timing 515, is moved forward to 10:00, and the E-mail reception processing, which has been scheduled to be executed at 10:50 which is the timing 518, is moved forward to 10:30.

Consequently, the image processing apparatus, which ought to have originally operated as the power saving mode during 10:10 to 10:20 and 10:40 to 10:50 only, can continuously operates as the power saving mode during 10:10 to 10:30 and 10:40 to 11:00.

Subsequent to the time 11:00, the same processing is repeated.

In the meantime, at step S303, if determined YES, the execution time (t1+p1) is set to the next periodic processing (time t3) by step S305, and therefore, for example, in time 08:50 (t1), in the timing 513, the next execution time (t1+p1) of the E-mail reception processing (at intervals of 30 minutes (interval p1)) newly registered is 09:20. When comparing 10:00 (time t2) and 09:20 (t1+p1), since 09:20 is the earlier time (determination at step S303 shown in FIG. 3 is YES), it is decided that the next periodic processing (time t3) is moved forward to the timing 514 and is executed at 09:20 (time t1+p1).

In this manner, the iFax reception processing, which ought to have originally been executed at 10:30 which is the timing 516, can be moved forward to 10:00, and the SNTP time synchronization processing and the ifax reception processing, which ought to have been executed at 10:00 which is the timing 516, can be moved forward to 09:20.

Figure 6:
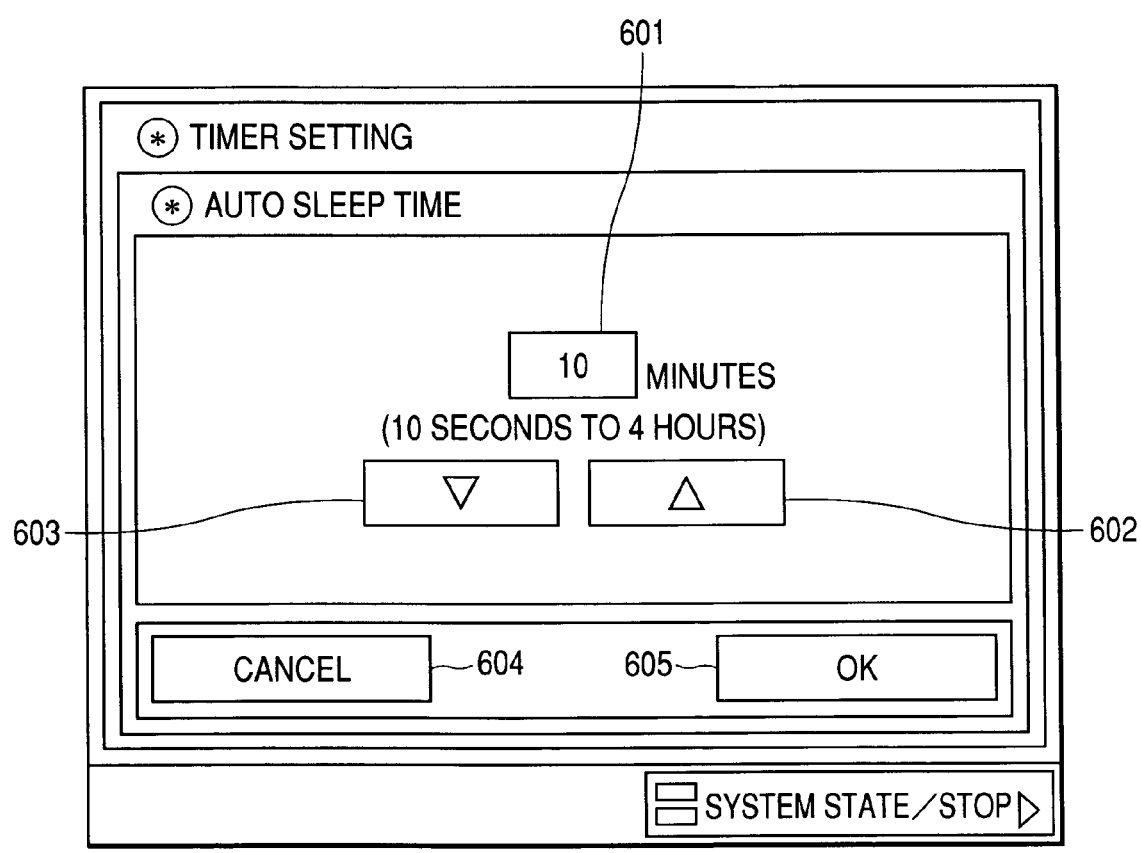
FIG. 6 is a view showing one example of a user interface screen displayed in the operation panel shown in FIG. 1.

FIG. 6 is a view showing one example of the user interface screen displayed in the operation panel 109 shown in FIG. 1. In the present embodiment, the user interface using a touch panel is adopted.

A time (auto sleep time) for continuing a non-operation state for moving to the power saving mode can be set up.

In FIG. 6, reference numeral 601 shows a current auto sleep setup value (for example 10 minutes). The auto sleep time is adjusted by depressing an "Up" key 602 and a "Down" key 603. When an "OK" key is depressed, the setup is completed. When a "Cancel" key is depressed, the setup content is destroyed.

According to the above described embodiments, in the digital composite machine mounted with the function performing various periodic processings, in case each time interval is set up for a plurality of periodic processings, the number of periodic processing times can be made smaller as seen from the entire apparatus.

(Second Embodiment)

A configuration of a data processing program readable by an image processing apparatus according to the present invention will be described below with reference to a memory map shown in FIG. 7.

FIG. 7 is a view explaining the memory map of a storage medium storing various data processing programs readable by the image processing apparatus according to the present invention.

Although not particularly illustrated, the memory map is also sometimes stored with information for controlling a group of programs stored in the storage medium, for example, information storing version information and a preparer and the like, and moreover, information depending on the OS and the like of the program reading side, and for example, an icon and the like that identify and display programs.

Further, the data affiliated with various programs is also controlled by the directory. Further, the memory map is also sometimes stored with a program for installing various programs into a computer, and a program and the like which decompress in case the program to be installed into a computer is compressed.

The function shown in FIG. 7 in the present embodiment may be executed by a program installed from outside by a host computer. In that case, even when a group of information including programs is supplied to an output device by the storage medium such as CD-ROM, a flash memory, FD, and the like or from the external storage medium through a network, the present invention can be applied.

As described above, it goes without saying that the storage medium having recorded a program code of the software for realizing the function of the above described embodiments is supplied to the system or the apparatus, and the computer (or CPU and MPU) of that system or apparatus reads and executes the program code stored in the storage medium, thereby achieving the object of the present invention.

In this case, the program code itself read from the storage medium realizes a new function of the present invention, and the storage medium having stored the program code configures the present invention.

Consequently, if provided with the function of a program, a form of the program does not matter whether it is an object code, a program executed by an interpreter, a script data supplied to the OS and the like.

As the storage medium for supplying a program, for example, a flexible disk, a hard disk, an optical disk, a magneto-optical disk, MO, CD-ROM, CD-R, CD-RW, a magnetic tape, a non-volatile memory card, ROM, DVD and the like can be used.

In this case, the program code itself read from the storage medium realizes the function of the above described embodiments, and the storage medium having stored the program code configures the present invention.

In addition, as the supplying method of a program, by using a browser of the client computer, a connection is made to the home page of the Internet, and from the home page, the computer program itself of the present invention or the compressed file including an automatic installation function is downloaded into the storage medium such as a hard disk and the like, thereby supplying the program. Further, the program code configuring the program of the present invention is divided into a plurality of files, and each file is downloaded from different home pages, thereby realizing the function processing. That is, a WWW server, an FTP server, and the like, which allow the program file for realizing the function processing of the present invention by the computer to be downloaded for a plurality of users, are also included in the claims of the present invention.

Further, the program of the present invention CD-ROM and the like, and is distributed to the users, and the users who have cleared the prescribed conditions are allowed to download key information for deciphering the cipher from the home page through the Internet, and by using the key information, the ciphered program is executed, and is installed in the computer, thereby realizing the function-processing.

Further, it goes without saying that there are also the cases included where, by executing the program code read by the computer, not only the function of the above described embodiments is realized, but based on the instruction of the program code, there are also the cases where the OS (operating system) and the like working on the computer execute a part or a whole of the actual processing, and by that processing, the function of the above described embodiments is realized.

Further, it goes without saying that there are also the cases included where the program code read from the storage medium is written in the memory provided for a function expansion board inserted into the computer or a function expansion unit connected to the computer, and after that, based on the instruction of that program code, the CPU and the like provided for the feature expansion board and the feature expansion unit execute a part or a whole of the actual processing, and by that processing, the function of the above described embodiments is realized.

The present invention is not limited to the above described embodiments, and various modifications (including an organic combination of each embodiment) based on the spirit of the present invention may be made without being excluded from the scope of the present invention.

Although various examples and embodiments of the present invention have been shown and described, it will be appreciated by those skilled in the art that the spirit and scope of the present invention are not limited to any particular description within the present specification.

It is to be noted that the present invention is not limited to the above described embodiments, and it should be understood that various modifications and changes may be added without departing from the spirit of the present invention.

This application claims priority from Japanese Patent Application No. 2004-219634 filed on Jul. 28, 2004, which is hereby incorporated by reference herein.

What is claimed is:

1. An image processing apparatus comprising a processor capable of executing plural types of periodic processings to be repetitively executed periodically, the image processing apparatus comprising:
a processor;
a first input unit configured to input a first execution time interval indicating which indicates an execution interval of a first type of periodic processing;
a second input unit configured to input a second execution time interval which is different from the first execution time interval and which indicates an execution interval of a second type of periodic processing; and
an execution unit configured to, in a case where the second execution time interval is input by the second input unit after the first execution time interval is input by the first input unit, (1) start both the first type of periodic processing and the second type of periodic processing at a next start time for the first type of periodic processing if the next start time for the first type of periodic processing is earlier than a next start time for the second type of periodic processing, and (2) start both the first type of periodic processing and the second type of periodic processing at the next start time for the second type of periodic processing if the next start time for the second type of periodic processing is earlier than the next start time for the first type of periodic processing,
wherein, after both the first type of periodic processing and the second type of periodic processing are started by the execution unit, the first type of periodic processing is repetitively executed periodically according to the first execution time interval and the second type of periodic processing is repetitively executed periodically according to the second execution time interval.

2. The image processing apparatus according to claim 1, wherein the periodic processing is either of (a) a periodic enquiry processing toward a POP (Post Office Protocol) server for receiving an E-mail or (b) a periodic enquiry toward an SNTP (Simple Network Time Protocol) server for synchronizing a time.

3. The image processing apparatus according to claim 1, wherein, in a case where the second type of periodic processing does not exist, the execution unit starts an initial first type of periodic processing at a time when the first execution time interval elapses from a time when the first execution time interval was input by the first input unit.

4. The image processing apparatus according to claim 1, wherein, in a case where a start time for a third type of periodic processing is later than the next start time for the first type of periodic processing, the execution unit starts the third type of periodic processing at the next start time for the first type of periodic processing.

5. The image processing apparatus according to claim 1, further comprising a holding unit configured to hold contents of the first type of periodic processing and the first execution time interval.

6. The image processing apparatus according to claim 1, further comprising:
a setting unit configured to set the next start time for the first type of periodic processing and the next start time for the second type of periodic processing;
a comparison unit configured to compare the next start time for the first type of periodic processing and the next start time for the second type of periodic processing with each other, both set by the setting unit, and
wherein, in a case where the next start time for the first type of periodic processing and the next start time for the second type of periodic processing are different from each other as a result of the comparison by the comparison unit, the execution unit starts the first type of periodic processing and the second type of periodic processing at a same time.

7. The image processing apparatus according to claim 1, wherein the first periodic processing is processing in which the image processing apparatus acquires information by accessing an external apparatus.

8. The image processing apparatus according to claim 1, wherein each of the first input unit and the second input unit inputs an instruction of a user using an operation unit of the image processing apparatus.

9. A control method of an image processing apparatus capable of executing plural types of periodic processings to be repetitively executed periodically, the method comprising:

inputting a first execution time interval which indicates an execution interval of a first type of periodic processing;

inputting a second execution time interval which is different from the first execution time interval and which indicates an execution interval of a second type of periodic processing; and executing, in a case where the second execution time interval is input after the first execution time interval is input, (1) to start both the first type of periodic processing and the second type of periodic processing at a next start time for the first type of periodic processing if the next start time for the first type of periodic processing is earlier than a next start time for the second type of periodic processing, and (2) to start both the first type of periodic processing and the second type of periodic processing at the next start time for the second type of periodic processing if the next start time for the second type of periodic processing is earlier than the next start time for the first type of periodic processing, wherein, after both the first type of periodic processing and the second type of periodic processing are started, the first type of periodic processing is repetitively executed periodically according to the first execution time interval and the second type of periodic processing is repetitively executed periodically according to the second execution time interval.

10. The control method according to claim 9, wherein the periodic processing is either of (a) a periodic enquiry processing toward a POP (Post Office Protocol) server for receiving an E-mail or (b) a periodic enquiry toward an SNTP (Simple Network Time Protocol) server for synchronizing a time.

11. The control method according to claim 9, wherein, in a case where the second type of periodic processing does not exist, an initial first type of periodic processing is started at a time when the execution time interval elapses from a time when the first execution time interval was input.

12. The control method according to claim 9, wherein, in a case where a start time for a third type of periodic processing is later than the next start time for the first type of periodic processing, the third type of periodic processing is started at the next start time for the first type of periodic processing.

13. The control method of the image processing apparatus according to claim 9, further comprising holding contents of the first type of periodic processing and the first execution time interval.

14. A computer executable program for enabling an image processing apparatus to execute plural types of periodic processings to be repetitively executed periodically, the program comprising:

code of inputting a first execution time interval which indicates an execution interval of a first type of periodic processing;

code of inputting a second execution time interval which is different from the first execution time interval and which indicates an execution interval of a second type of periodic processing; and code of, in a case where the second execution time interval is input after the first execution time interval is input, (1) to start both the first type of periodic processing and the second type of periodic processing at a next start time for the first type of periodic processing if the next start time for the first type of periodic processing is earlier than a next start time for the second type of periodic processing, and (2) to start both the first type of periodic processing and the second type of periodic processing at the next start time for the second type of periodic processing if the next start time for the second type of periodic processing is earlier than the next start time for the first type of periodic processing, wherein, after both the first type of periodic processing and the second type of periodic processing are started, the first type of periodic processing is repetitively executed periodically according to the first execution time interval and the second type of periodic processing is repetitively executed periodically according to the second execution time interval.

* * * * *